United States Patent
Shimazaki et al.

(10) Patent No.: US 6,785,404 B1
(45) Date of Patent: Aug. 31, 2004

(54) IMAGE POSITIONAL RELATION CORRECTION APPARATUS, STEERING SUPPORTING APPARATUS PROVIDED WITH THE IMAGE POSITIONAL RELATION CORRECTION APPARATUS, AND IMAGE POSITIONAL RELATION CORRECTION METHOD

(75) Inventors: Kazunori Shimazaki, Aichi-ken (JP); Hiroshi Tanaka, Aichi-ken (JP); Isao Suzuki, Aichi-ken (JP); Kyoko Ito, Aichi-ken (JP); Tomohiro Yamagami, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 603 days.

(21) Appl. No.: 09/691,716

(22) Filed: Oct. 18, 2000

(30) Foreign Application Priority Data

Oct. 19, 1999 (JP) .............................. 11-296514
May 17, 2000 (JP) ....................... 2000-145015

(51) Int. Cl.⁷ ............................................... G06K 9/00
(52) U.S. Cl. ....................... 382/104; 382/291; 382/294; 340/907; 340/937; 348/113; 701/41; 701/301; 396/188
(58) Field of Search ................................ 382/104, 291, 382/293, 294; 340/907, 933; 396/188; 348/113, 706; 345/8; 701/301, 41, 42; 180/252, 6.28, 204; 191/4

(56) References Cited

U.S. PATENT DOCUMENTS 5,319,444 A * 6/1994 Saitoh et al. ............... 356/401
5,595,271 A * 1/1997 Tseng .............................. 191/4
6,166,744 A * 12/2000 Jaszlics et al. .............. 345/629
6,181,302 B1 * 1/2001 Lynde ............................ 345/7
6,226,592 B1 * 5/2001 Luckscheiter et al. ...... 701/301
6,522,312 B2 * 2/2003 Ohshima et al. ............... 345/8
6,559,813 B1 * 5/2003 DeLuca et al. ................. 345/8
2002/0084974 A1 * 7/2002 Ohshima et al. ............ 345/156
2002/0167498 A1 * 11/2002 Eschler et al. .............. 345/204
2002/0171666 A1 * 11/2002 Endo et al. ................. 345/619
2003/0074119 A1 * 4/2003 Arlinsky ...................... 701/36

FOREIGN PATENT DOCUMENTS

JP          10-244891         9/1998

* cited by examiner

Primary Examiner—Timothy M. Johnson
Assistant Examiner—Barry Choobin
(74) Attorney, Agent, or Firm—Morgan & Finnegan, LLP (57) ABSTRACT

An image positional relation apparatus is provided, in which coordinate data of a real targed photographed by a CCD camera and coordinate data of a virtual target logically calculated from the predetermined position of the real target are transmitted to a superimpose circuit, and the real target and the virtual target are superimposed to be displayed on a monitor screen. A user operates a controller so that the real target coincides with the virtual target. An amount of such operation is transmitted to the superimpose circuit as a correction amount, and the positional relation between the real target and the virtual target, i.e., the positional relation between the real image and the virtual image can be properly corrected.

14 Claims, 9 Drawing Sheets

IMAGE POSITIONAL RELATION CORRECTION APPARATUS, STEERING SUPPORTING APPARATUS PROVIDED WITH THE IMAGE POSITIONAL RELATION CORRECTION APPARATUS, AND IMAGE POSITIONAL RELATION CORRECTION METHOD

BACKGROUND OF THE INVENTION

1. Field of the Invention

The present invention relates to an image positional relation correction apparatus for correcting the relative positional relation between a real image and a virtual image, a steering supporting apparatus provided with the image positional relation correction apparatus, and an image positional relation correction method.

2. Description of the Related Art

Conventionally, a steering supporting apparatus configured to show a rear image and a steering supporting guide on a monitor so that a steering wheel can be operated even if a driver cannot see a targeted position because a vehicle is in the driver's blind spot. Such an apparatus is provided with a CCD camera for taking a real image of the rear of a vehicle, a monitor for showing an image taken by the CCD camera, a sensor for detecting information on a tire steering angle and the like, a circuit for providing a steering supporting guide as a virtual image for the purpose of providing a driver with appropriate steering information in accordance with the information from the sensor, and a circuit for display while superimposing the rear image of the vehicle and the steering supporting guide on a monitor screen.

Figure 10A:
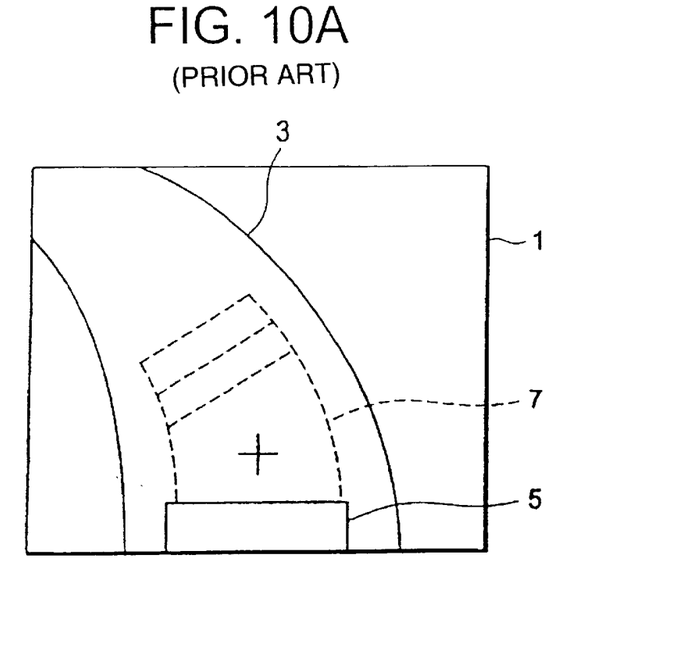
FIG. 10A illustrates a monitor screen of a conventional steering supporting apparatus in the normal state in which the optical axis of a lens coincides with the center of a CCD area sensor.
Figure 10B:
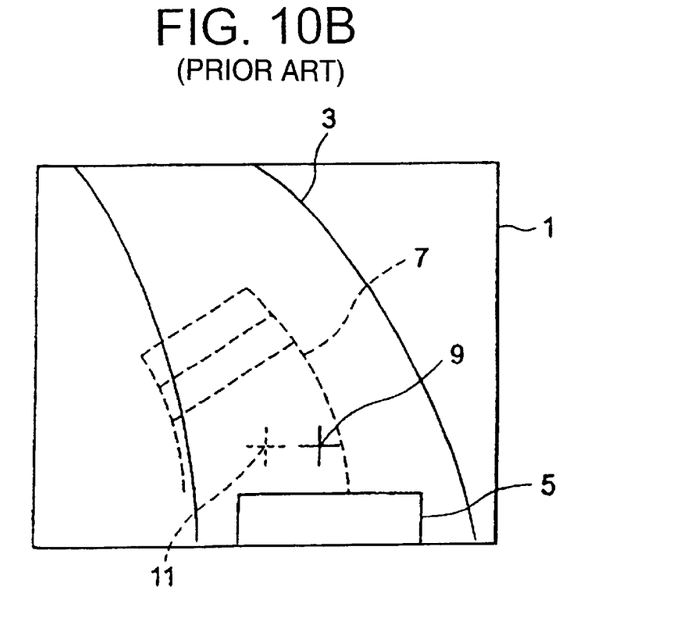
FIG. 10B illustrates a monitor screen of a conventional steering supporting apparatus in the state in which the optical axis of the lens and the center of the CCD area sensor deviate.

Here, the CCD camera includes a lens and a CCD area sensor and is assembled in the state in which the optical axis of the lens and the center of the CCD area sensor are made coincide with each other, and, for example, a road 3 and a vehicle rear bumper 5 contained in the vehicle rear image, and a steering supporting guide 7 are displayed in an appropriate positional relation on a monitor screen 1 as shown in FIG. 10A in a normal state in which the CCD camera is mounted on the vehicle in a standard mounting position and angle. However, if the optical axis of the lens and the center of the CCD area sensor do not coincide with each other or if the CCD camera is not properly mounted on the vehicle as prescribed by the standard, as shown in FIG. 10B on the monitor screen 1, a vehicle rear image center 9 and a monitor screen center 11 for drawing the steering supporting guide 7 may not coincide with each other and the road 3 and the vehicle rear bumper 5, and the steering supporting guide 7 may shift from the appropriate positional relation.

In this case, the driver may not be able to back the vehicle as desired even if the driver moves the vehicle in accordance with the steering supporting guide 7. Therefore, the optical axis is usually adjusted so that the optical axis of the lens passes through the center of the CCD area sensor, that is, the relative positional relation between the CCD area sensor and the lens is adjusted. In addition, the mounting state of the CCD camera is adjusted for each individual vehicle so that the CCD camera is mounted on the vehicle as prescribed by the standard.

However, the above-mentioned adjustment of the optical axis is performed by physically adjusting the position of a lens at the time of fitting the lens. Therefore, it is difficult to perform the adjustment of the optical axis with high accuracy. In addition, there is a problem in that costs increase substantially if higher accuracy is sought.

Moreover, a lot of time is consumed in the adjustment work for mounting a CCD camera on a vehicle as prescribed by the standard. In addition, there is also a problem in that it is difficult to mount a CCD camera with high accuracy as prescribed by the standard, and that deviation arises in the actual state of mounting a CCD camera on a vehicle compared with the standard.

SUMMARY OF THE INVENTION

The present invention has been devised in view of the above and other drawbacks, and it is an object of the present invention to provide an image positional relation correction apparatus capable of properly correcting the positional relation between a real image and a virtual image without performing a physical optical axis adjustment, or without performing adjustment work for mounting a CCD camera on a vehicle as prescribed by the standard.

An image positional relation correction apparatus in accordance with the present invention is an image positional relation correction apparatus for correcting the relative positional relation between a real image taken by a camera and a virtual image superimposed to be displayed on a monitor screen together with the real image, which comprises real target providing means disposed in the object area of the camera for causing the camera to photograph a real target, virtual target providing means for providing a virtual target theoretically derived from the coordinates of the real target on the same coordinate system as the virtual image, and correcting means for correcting the relative positional relation between the real image and the virtual image based on the deviation of the real target and the virtual target.

In addition, a steering supporting apparatus in accordance with the present invention is provided with the image positional relation correction apparatus according to a first aspect of the present invention, wherein each of the real image and the virtual image is a rear image of a vehicle and a steering supporting guide.

Moreover, an image positional relation correction method in accordance with the present invention is an image positional relation correction method for correcting the relative positional relation between a real image taken by a camera and a virtual image to be superimposed to be displayed on a monitor screen together with the real image comprising the steps of taking a real target by a camera, setting a virtual target theoretically derived from the coordinates of the real target on the same coordinate system as the virtual image, and correcting the relative relation between the real image and the virtual image based on the deviation between the real target and the virtual target.

DESCRIPTION OF THE PREFERRED EMBODIMENTS

An embodiment in which an image positional relation correction apparatus of the present invention is applied to the case for correcting the image positional relation between a vehicle rear image and a steering supporting guide in a steering supporting apparatus of a vehicle will be hereinafter described with reference to the accompanying drawings.

First Embodiment

Figure 1:
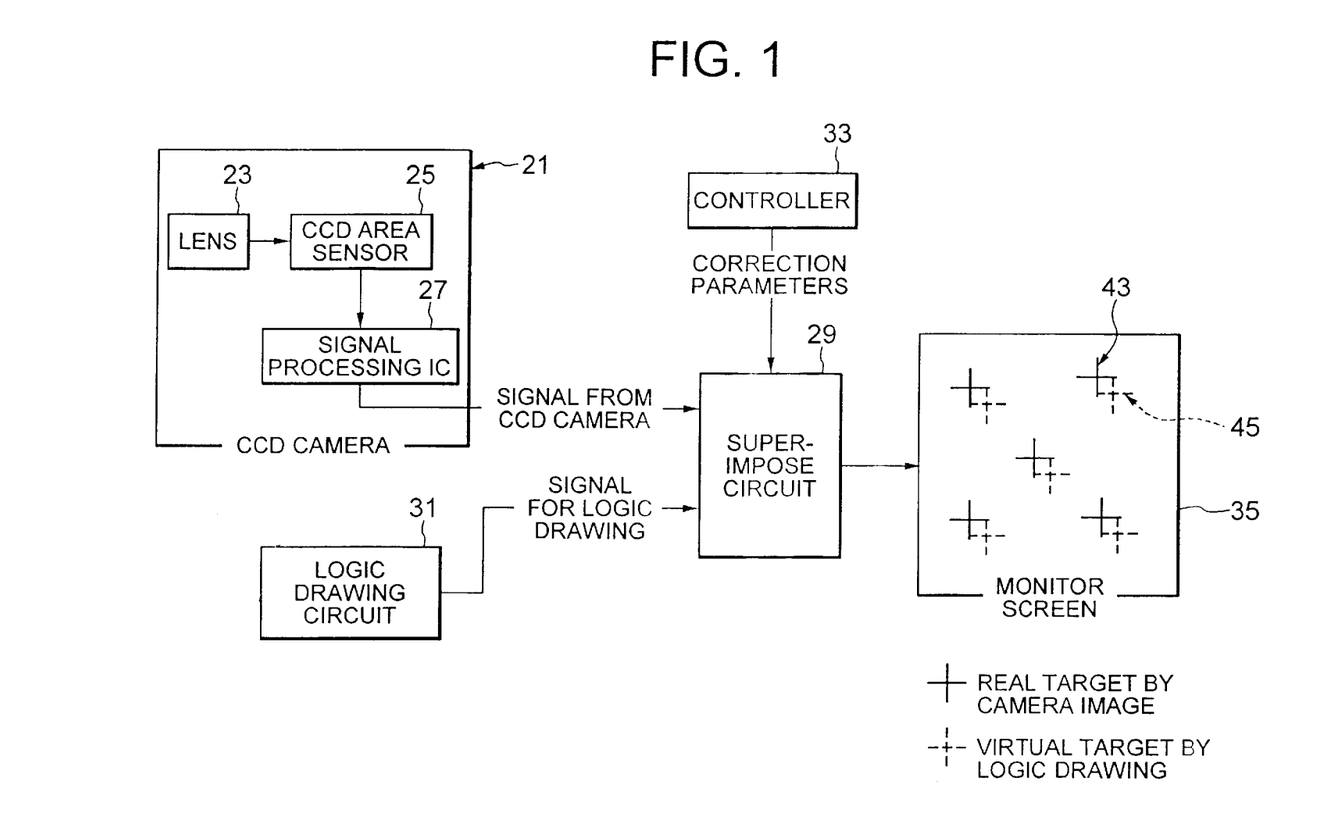
FIG. 1 is a block diagram illustrating an outline of an image positional relation correction apparatus in accordance with a first embodiment of the present invention.
Figure 2:
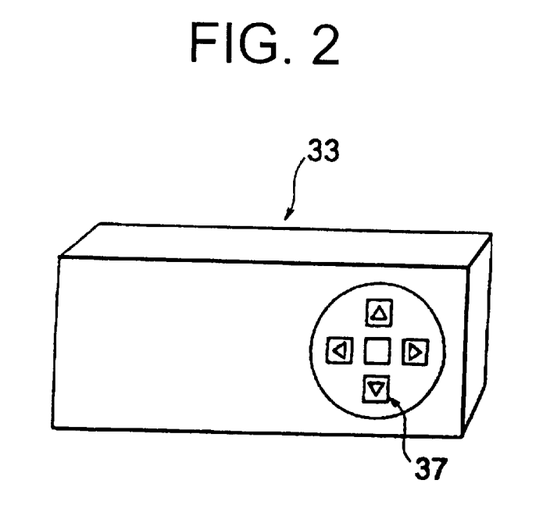
FIG. 2 is a view schematically illustrating a controller of an image positional relation correction apparatus in accordance with the first embodiment of the present invention.

FIG. 1 is a block diagram illustrating the outline of an image positional relation correction apparatus in accordance with a first embodiment of the present invention. A CCD camera 21 is provided with a lens 23, a CCD area sensor 25 and a signal processing IC 27. A signal from the signal processing IC 27 is to be inputted in a superimpose circuit 29. Moreover, a signal from a logic drawing circuit 31 and a correction signal from a controller 33 are also to be inputted in the superimpose circuit 29. A signal from the superimpose circuit 29 is to be outputted to a monitor 35. In addition, as shown in FIG. 2, the controller 33 consists of a housing, and a cross button 37 capable of inputting a correction amount in the upward, downward, leftward and rightward directions is provided on its front face.

Figure 3:
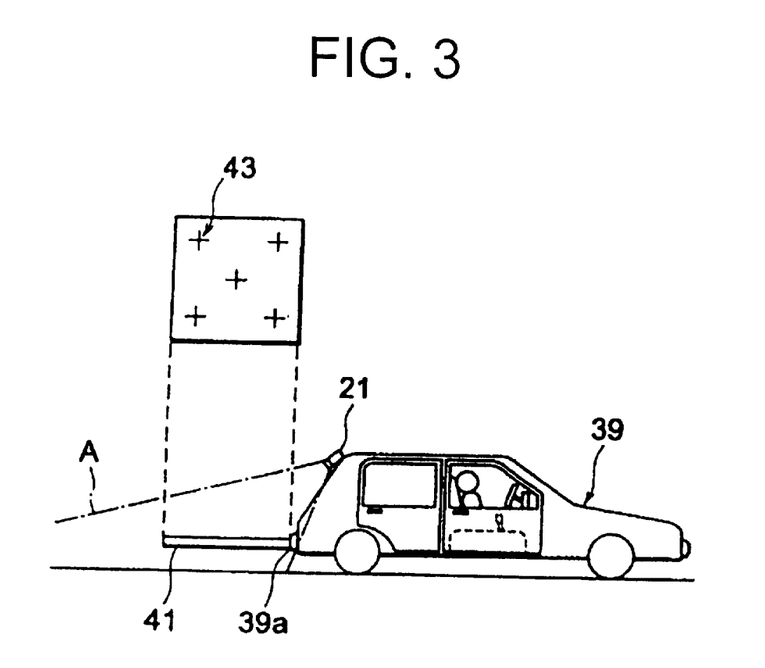
FIG. 3 is a view schematically illustrating the state in which a test chart member as real target providing means is mounted on the rear part of a vehicle.

Operations of the image positional relation correction apparatus in accordance with this embodiment will now be described. First, as shown in FIG. 3, the CCD camera 21 for taking a vehicle rear image as a real image is mounted on the rear part of a vehicle 39. In addition, the front end of a test chart member 41 as real target providing means is attached to a rear bumper 39a of the vehicle 39. In this way, the test chart member 41 is disposed within an object area A of the CCD camera 21. Five cross-shaped real targets 43 are drawn on the upper surface of the plate-like test chart member 41. A real image including the real target 43 is taken in from the CCD area sensor 25 via the lens 23. A signal for the real image taken in from the CCD area sensor 25 is transmitted to the signal processing IC 27, where the signal is processed as coordinate data of the real target 43 and is outputted to the superimpose circuit 29. On the other hand, a signal for a virtual target 45 is inputted in the superimpose circuit 29 from the logic drawing circuit 31 as virtual target providing means.

Derivation of the virtual target 45 in the logic drawing circuit 31 will now be described. Since the position of the real target 43 on the test chart member 41 is predetermined and the form for attaching the test chart member 41 to the vehicle is also predetermined, when the image of the real target 43 is taken by the CCD camera 21, the coordinates of the real target 43 on the monitor screen can be calculated logically in advance. The logic drawing circuit 31 outputs the coordinates thus logically calculated to the superimpose circuit 29 as coordinate data of the virtual target 45.

In the superimpose circuit 29, the coordinate data of the real target 43 outputted from the CCD camera 21 and the coordinate data of the virtual target 43 outputted form the logic drawing circuit 31 are calculated, to thereby superimpose the real target 43 and the virtual target 45, denoted by a solid line and a dotted line respectively, to be displayed on the monitor screen 35. Then, if the optical axis of the lens 23 and the center of the CCD area sensor 25 coincide with each other properly at this point, the position of the photographed real target 43 and the position of the virtual target 45 logically calculated corresponding to the setting position of the real target 43 are superimposed on the monitor screen 35. However, if the optical axis of the lens 23 does not coincide with the center of the CCD area sensor 25, the position of the real target 43 actually photographed is slightly deviated from its original position, i.e., the logically calculated position of the virtual target 45 as shown in FIG. 1.

When it is confirmed in this way that the optical axis of the lens 23 does not coincide with the center of the CCD area sensor 25, a user operates the cross button 37 of the controller 33 to the direction for superimposing the virtual target 45 with the real target 43. A correction amount inputted by the user via the cross button 37 of the controller 33 is inputted in the superimpose circuit 29, where the position of the virtual target 45 by logic drawing is corrected depending on the correction amount and displayed on the monitor screen 35 again. The user, while comparing the position of the virtual target 45 after correction and the position of the real target 43, operates the controller 33 if further correction is necessary until both positions overlap.

In this way, when the correction is completed so that the position of the virtual target 45 coincides with the position of the real target 43, such correction amount is stored in a memory of the superimpose circuit 29. Then, the superimpose circuit 29 thereafter renders correction processing with the same correction amount as above on data of a virtual image in the same coordinate system as the virtual target 45 outputted from the logic drawing circuit 31, for example, display data and the like of the steering supporting guide. In this way, even if the optical axis of the lens 23 does not coincide with the center of the CCD area sensor 25, the positional relation between the real image and the virtual image can be properly corrected without physically adjusting the optical axis of the lens 23; that is, the positional relation between the vehicle rear image as a real image and the steering supporting guide as a virtual image can be made proper.

Second Embodiment

Figure 4:
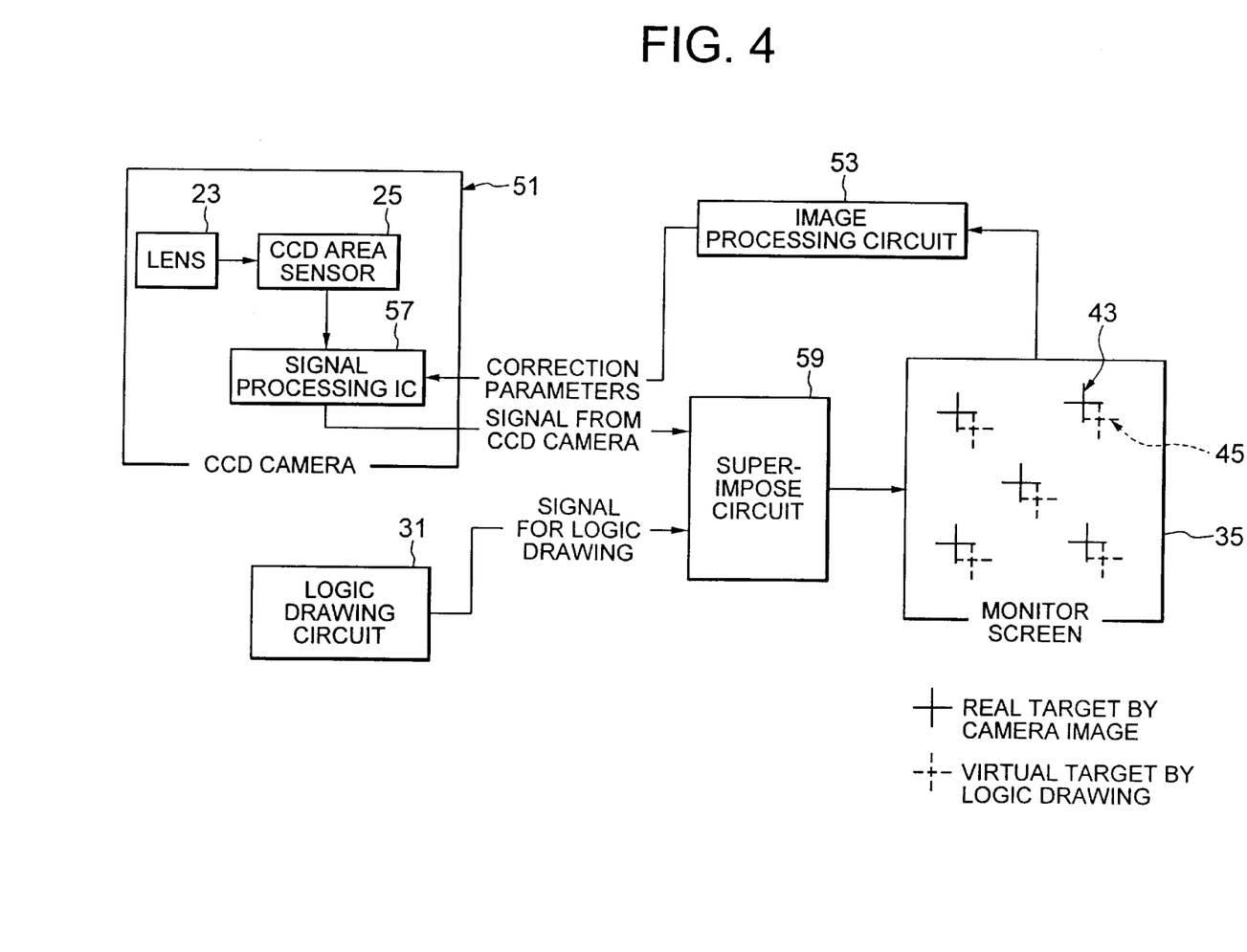
FIG. 4 is a block diagram illustrating the outline of an image positional relation correction apparatus in accordance with a second embodiment of the present invention.

FIG. 4 is a block diagram illustrating an outline of an image positional relation correction apparatus in accordance with a second embodiment of the present invention. The image positional relation correction apparatus in accordance with this second embodiment is different from the above-mentioned image positional relation correction apparatus in accordance with the first embodiment mainly in that the former is provided with an image processing circuit 53 as correction means instead of the controller 33.

First, the real target 43 drawn on the same test chart member 41 as in the first embodiment is photographed by a CCD camera 51, and a coordinate data of the real target 43 processed by a signal processing IC 57 is inputted in a superimpose circuit 59. Moreover, a signal for the virtual target 45 logically calculated in the logic drawing circuit 31 is inputted in the superimpose circuit 59.

The superimpose circuit 59 superimposes to display the real target 43 and the virtual target 45 on the monitor screen 35 based on the coordinate data of the inputted real target 43 and the coordinate data of the virtual target 45. Then, since the optical axis of the lens 23 does not coincide with the center of the CCD area sensor 25, if the position of the real target 43 and the position of the virtual target 45 deviate, an image processing circuit 53 detects the above-mentioned deviation amount by image processing, to thereby calculate a correction amount for offsetting the deviation amount. The correction amount thus calculated is sent to the signal processing IC 57 in the CCD camera 51. In the signal processing IC 57, the coordinate data of the real target 43 actually photographed depending on the correction amount is corrected and outputted to the superimpose circuit 59 again. In this way, the deviation of the positional relation between the real image and the virtual image caused by the fact that the optical axis of the lens 23 and the center of the CCD area sensor 25 do not coincide with each other is corrected. In addition, such correction amount is stored in the signal processing IC 57, and correction processing is thereafter performed on the coordinate data of the photographed real image, i.e., the data of the vehicle rear view such as a road, the vehicle rear part bumper and the like. In this way, even if the optical axis of the lens 23 does not coincide with the center of the CCD area sensor 25, the positional relation between the vehicle rear image as a real image and the steering supporting guide as a virtual image can be made proper.

Third Embodiment

Although the correction amount inputted in the controller 33 is transmitted to the superimpose circuit 29 in the first embodiment, in the third embodiment, the correction amount inputted in the controller 33 is transmitted to the CCD camera, for example, via a serial interface of the CCD camera, and image data correction is performed in the CCD camera. In such a form, as in the first embodiment, the positional relation between the vehicle rear image as a real image and the steering supporting guide as a virtual image can be made proper.

Fourth Embodiment

An image positional relation correction apparatus in accordance with a fourth embodiment corrects the relative positional relation between a real image and a virtual image in the case in which not only the optical axis of the lens does not coincide with the center of the CCD sensor area, but the CCD camera is not properly mounted on a vehicle as prescribed by the standard.

Figure 5A:
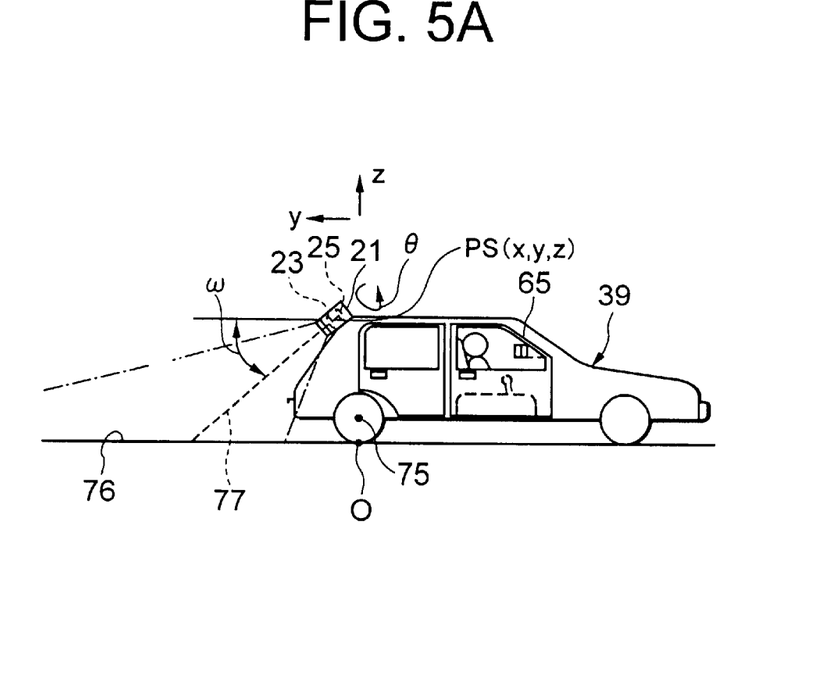
FIG. 5A is a side view showing the state in which an image positional relation correction apparatus in accordance with a fourth embodiment of the present invention is mounted on a vehicle.
Figure 5B:
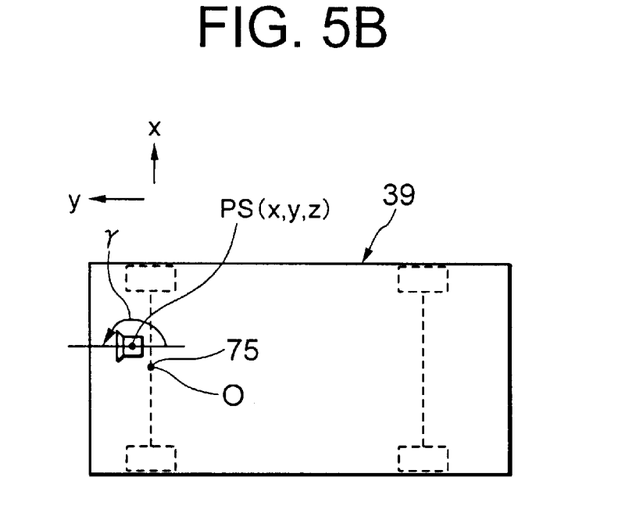
FIG. 5B is a plan view showing the state in which an image positional relation correction apparatus in accordance with the fourth embodiment of the present invention is mounted on a vehicle.

First, the state in which the image positional relation correction apparatus in accordance with this fourth embodiment is mounted on a vehicle will be described. As shown in FIGS. 5A and 5B, the CCD camera 21 for taking a vehicle rear image is mounted on the rear part of the vehicle 39. The CCD camera 21 is provided with the lens 23 and the CCD area sensor 25. In addition, a monitor 65 is provided in the front of the driver's seat of the vehicle 39.

An ideal state in which the CCD camera 21 is mounted on the vehicle as prescribed by the standard and an optical axis 77 of the lens 23 of the CCD camera 21 coincides with the center of the CCD area sensor 25 will be described.

For the convenience of description, a road surface coordinate system is assumed where a point on the ground vertically down from a rear axle center 75 of the vehicle to a road surface 76 is assumed to be an origin O, a horizontal direction toward the rear of the vehicle 39 is assumed to be a y axis positive direction, a horizontal direction toward the left of the vehicle 39 is assumed to be an x axis positive direction, and a vertical direction upward of the vehicle 39 is assumed to be a z axis positive direction.

The CCD camera 21 is disposed on the standard mounting position of a coordinate point PS (x, y, z) displayed the road surface coordinate system with a standard mounting angles of a depression angle $\omega$, a direction angle $\gamma$ and a rotation angle $\theta$. Here, the depression angle $\omega$ represents an angle downward from a y axis direction, the direction angle $\gamma$ represents an angle from a y axis negative direction on a surface parallel with a x-y plane, and the rotation angle $\theta$ is an angle with which the CCD camera 21 is rotated around the optical axis center 77 to be amounted.

In addition, the positional deviation amount to the x axis positive direction of the center of the CCD area sensor 25 against the optical axis 77 of the lens 23 is assumed to be $\Delta Cx$, and the positional deviation amount to the y axis positive direction is assumed to be $\Delta cy$. Here, x, y, z, $\omega$, $\gamma$, $\theta$, $\Delta Cx$ and $\Delta Cy$ are assumed to be standard mounting parameters even if they are predetermined values.

Particularly, the optical axis 77 of the lens 23 of the CCD camera 21 and the center of the CCD area sensor 25 are positionally adjusted in the state in which they coincide with each other. That is, both the positional deviation amount $\Delta Cx$ to the x axis positive direction and the positional deviation amount $\Delta cy$ to the y axis positive direction of the CCD area sensor 25 against the optical axis 77 of the lens 23 are 0.

Figure 6A:
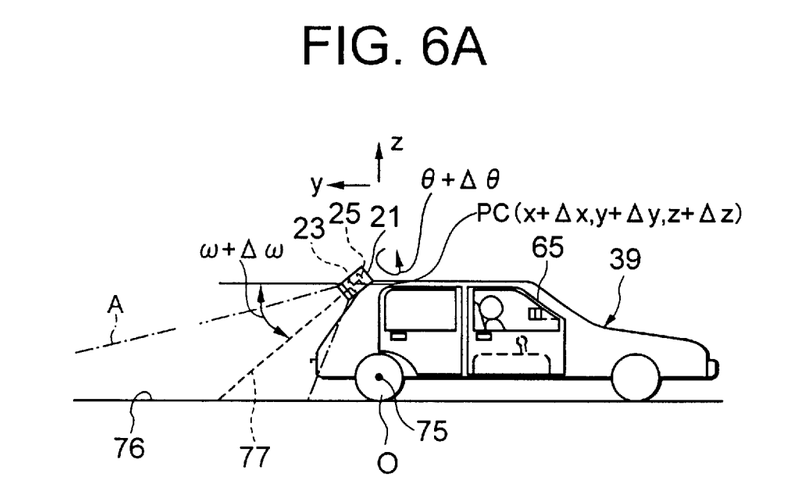
FIG. 6A is a side view showing the state in which an image positional relation correction apparatus in accordance with the fourth embodiment of the present invention is mounted on a vehicle.
Figure 6B:
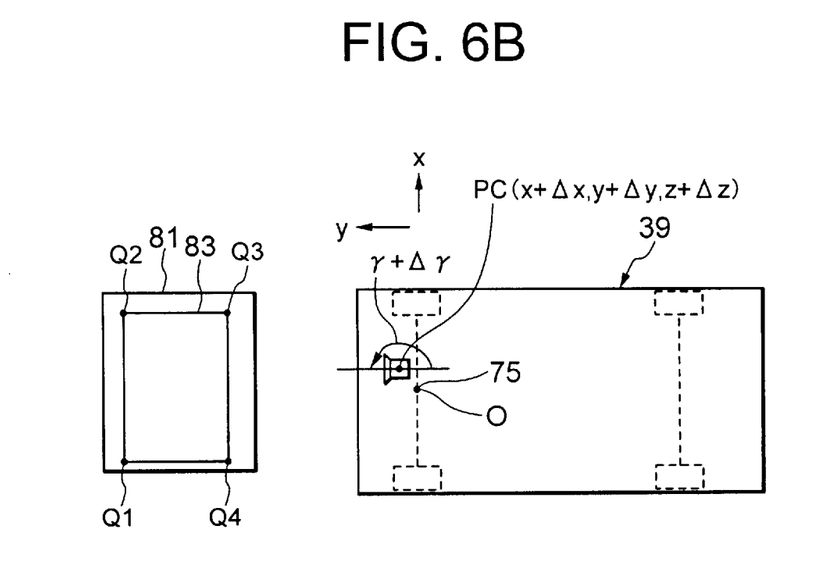
FIG. 6B is a plan view showing the state in which an image positional relation correction apparatus in accordance with the fourth embodiment of the present invention is mounted on a vehicle.

On the other hand, as shown in FIGS. 6A and 6B, if the CCD camera 21 is actually mounted on the vehicle 39, the CCD camera 21 is mounted with a mounting error against the standard, and the optical axis 77 of the lens 23 of the CCD camera 21 does not coincide with the center of the CCD area sensor 25.

In this case, the CCD camera 21 is disposed in the mounting position of a coordinate point PC (x+$\Delta$x, y+$\Delta$y, z+$\Delta$z) represented by the road surface coordinate system with the mounting angles of the depression angle $\omega+\Delta\omega$, the direction angle $\gamma+\Delta\gamma$ and the rotation angle $\theta+\Delta\theta$.

In addition, the positional deviation amount to the x axis positive direction of the CCD area sensor 25 is $\Delta Cx$, and the positional deviation amount to the y axis positive direction is $\Delta Cy$.

Here, x+$\Delta$x, y+$\Delta$y, z+$\Delta$z, $\omega+\Delta\omega$, $\gamma+\Delta\gamma$, $\theta+\Delta\theta$, $\Delta Cx$ and $\Delta Cy$ are assumed to be actual mounting parameters.

In addition, a test chart member 81 is disposed in a predetermined position that is apart from the origin O on the road surface in the backward direction of the vehicle 39 by a predetermined distance. The test chart member 81 is to be disposed in the object area A of the CCD camera 21. In addition, a real target 83 formed of a rectangular with four standard points Q1, Q2, Q3 and Q4 as vertexes is drawn on the upper surface of the test chart member 81.

Figure 7:
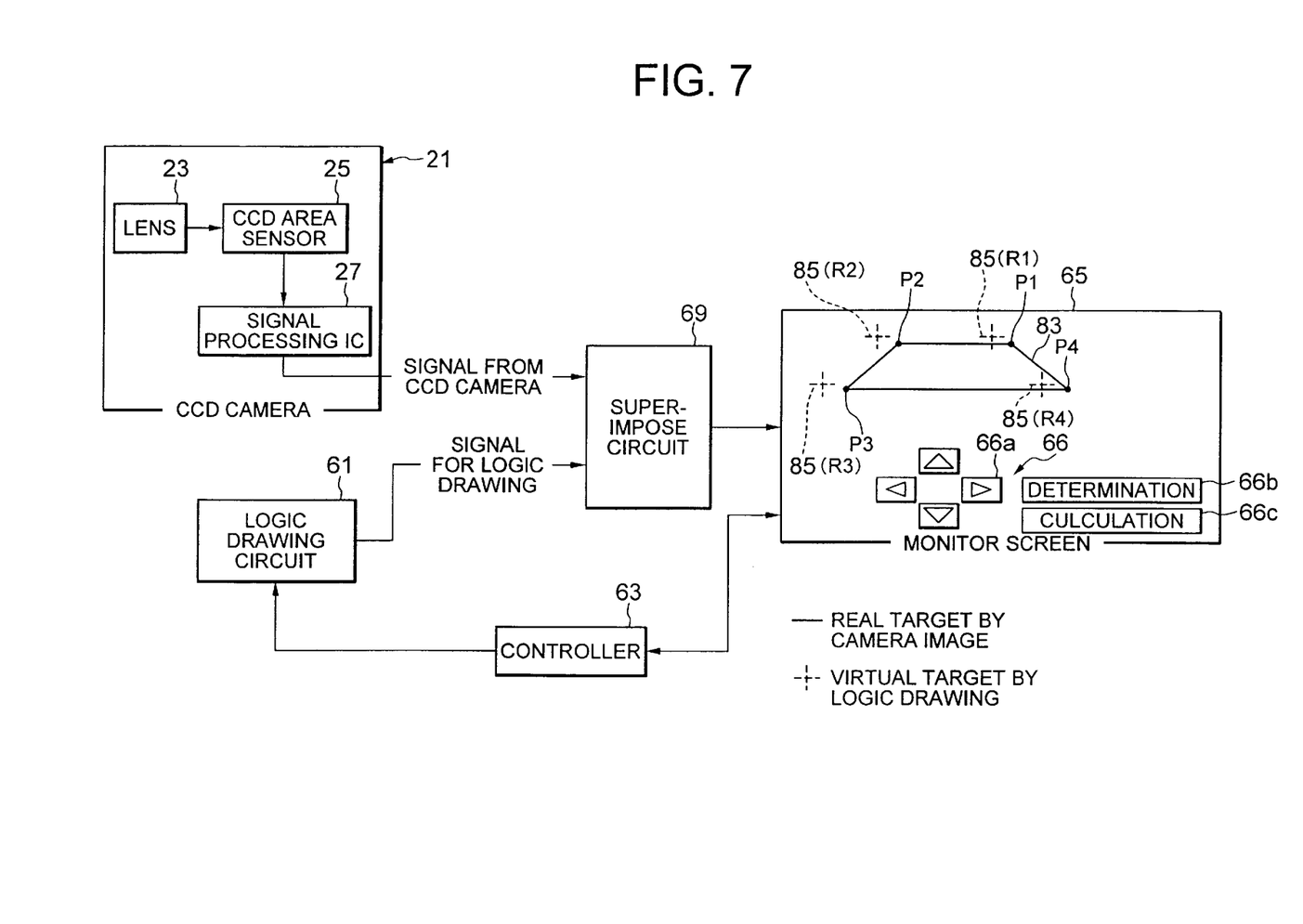
FIG. 7 is a block diagram illustrating an outline of an image positional relation correction apparatus in accordance with the fourth embodiment of the present invention.

FIG. 7 is a block diagram illustrating an outline of an image positional relation correction apparatus in accordance with an embodiment of the present invention. The CCD camera 21 is provided with the lens 23, the CCD area sensor 25 and the signal processing IC 27. A signal from the signal processing IC 27 is to be inputted in a superimpose circuit 69. Moreover, a signal from a logic drawing circuit 61 is also to be inputted in the superimpose circuit 69. A signal of the superimpose circuit 69 is outputted to a monitor 65. The monitor 65 is provided with a touch panel 66 having a cross-like button 66a for changing the position, a determination button 66b and a calculation button 66c. Moreover, the monitor 65 is connected to a controller 63, which controls the touch panel 66 and is connected to the logic drawing circuit 61. The controller 63, the touch panel 66 and the logic drawing circuit 61 forms correcting means. Furthermore, the logic drawing circuit 61 forms virtual target providing means as well.

Operations of this embodiment will now be described.

First, a real image including a real target 83 is taken in by the CCD area sensor 25 via the lens 23. A signal for the real image taken in by the CCD area sensor 25 is transmitted to the signal processing IC 27 where it is processed as coordinate data of the real target of the virtual coordinate system that is the same coordinate system as the virtual image, and is outputted to the superimpose circuit 69. On the other hand, a signal for a virtual target 85 including virtual target points R1 through R4 is inputted in the superimpose circuit 69 from the logic drawing circuit 61.

Here, derivation of the virtual target 85 in the logic drawing circuit 61 will be described. The positions of the standard points Q1 through Q4 on the test chart member 81 are predetermined and the form for mounting the test chart member 81 on a vehicle is also predetermined. The coordinates of the virtual target points R1 through R4 the logically derived virtual target 85 corresponding to the standard points Q1 through Q4 can therefore be calculated by a calculation method to be described later based on the standard mounting parameters. The logic drawing circuit 61 outputs the logically calculated coordinates to the superimpose circuit 69 as coordinate data.

In the superimpose circuit 69, the real target 83 and the virtual target 85 are denoted by solid lines and dotted lines respectively and are superimposed to be displayed on the monitor screen 65 by the coordinate data of the real target 83 outputted from the CCD camera 21 and the coordinate data of the virtual target 85 outputted from the logic drawing circuit 61. At this time, if the CCD camera 21 is mounted on a vehicle as prescribed by the standard, and the optical axis 77 of the lens 23 of the CCD camera 21 coincides with the center of the CCD area sensor 25, the positions of image standard points P1 through P4 being positions on the monitor screen of the standard points Q1 through Q4 of the actually photographed real target 83 and the positions of virtual target points R1 through R4 overlap on the monitor screen 65. However, if the CCD camera 21 is mounted with a mounting error with respect to the standard, or the optical axis 77 of the lens 23 of the CCD camera 21 and the center of the CCD area sensor 25 are in the state in which they do not coincide with each other, the positions of the image standard points Q1 through Q4 deviate from their original positions, i.e., the positions of the logically calculated virtual target points R1 through R4.

In such a case, a user operates the cross button 66a of the touch panel 66 to first make the virtual target point R1 overlap the image standard point P1. A shifting amount of the virtual target point R1 inputted by the user with the cross button 66a is inputted in the controller 63. Then, if the user presses the determination button 66b when the virtual target point R1 overlaps the standard point Q1, a signal of the determination button 66b is inputted to the controller 63, which calculates the coordinates of the image standard point P1 based on the shifting amount of the virtual target point R1. By repeating this operation to shift the virtual target points R2 through R4 one after another, the coordinates of the image standard points P2 through P4 are calculated.

Then, when the calculation button is pressed, the controller 63 outputs the image coordinate data of the image standard points P1 through P4 to the logic drawing circuit 61, which outputs real mounting parameters by a calculation method to be described hereinafter. Moreover, the controller 63 calculates the coordinates of new virtual target points R1 through R4 based on the real mounting parameters and displays the new virtual target points on the monitor screen 65. The user compares the positions of the corrected virtual target points R1 through R4 and the positions of the image standard points P1 through P4 and, if a further correction is necessary, operates the touch panel 66 again to make both the positions overlap each other completely.

In this way, when the correction is completed to make the positions of the virtual target points R1 through R4 coincide with the positions of the image standard points P1 through P4, the logic drawing circuit 61 prepares data of a virtual image of the same coordinate system as the virtual target, for example, display data and the like of the steering supporting guide, based on the real mounting parameters.

A method for the logic drawing circuit 61 calculating the coordinates of the virtual target points R1 through R4 of the virtual target 85 to be displayed on the monitor screen 65 using the standard mounting parameters, and further calculating the real mounting parameters from the coordinates of the virtual target points R1 through R4, the image standard points P1 through P4 and the standard mounting parameters will now be described.

Generally, the coordinate value of the image standard point P of the virtual coordinate system being the same coordinate system as the virtual target is represented by the function $$\xi = F(x1, x2, x3, x4, x5, x6, x7, x8, X_Q, Y_Q)$$

where the coordinates x, y, z of the mounting position of the CCD camera 21, the mounting angles $\omega, \gamma, \theta$, the positional deviation amount $\Delta Cx$ and $\Delta Cy$ between the optical axis 77 and the lens 23 and the center of the CCD area sensor 25 are assumed to be eight parameters x1 through x8 respectively, and the coordinate values of the road surface coordinate system of the standard point Q are assumed to be $X_Q$ and $Y_Q$.

The x, y coordinates of the image standard point P1, the x, y coordinate of P2, x, y coordinates of P3, and the x, y coordinates of P4 are assumed to be $\xi 1$ through $\xi 8$ respectively in this order, and is represented by a general equation $\xi n$ (provided that n is an integer number from 1 to 8).

For example, since $X_Q$ and $Y_Q$ are given as constants by the coordinate value of the standard point Q1, the x coordinates of the image standard point P1 is represented as follows:

$$\xi1 = F1\ (x1, x2, x3, x4, x5, x6, x7, x8)$$

In addition, concerning the coordinates of the image standard points P1 through P4 photographed in a real camera mounting state and shown on the monitor as shown in FIGS. 6A and 6B, the x, y coordinates of P1, the x, y coordinates of P2, the x, y coordinates of p3, and the x, y coordinates of P4 are assumed to be $\xi1'$ through $\xi8'$ and is represented by a general equation $\xi n'$ (provided that n is an integer number from 1 to 8).

The x coordinates and the y coordinates $\xi1'$ through $\xi8'$ of the image standard points P1 through P4 are already calculated by the controller 63.

Here, if the function fn (x1, ..., x8)=$\xi n - \xi n'$ is introduced, and the values of the real mounting parameter being the real camera mounting state is set, fn (x1, ..., x8)=0.

That is, if the values of the parameters x1 through x8 is calculated so that any of f1 through f8 is 0, these values become the values of the real mounting parameter.

The Newton-Raphson method is used in calculating the parameters x1 through x8.

When the Taylor's expansion expression is introduced with respect to the function fn, approximation can be found as follows:

$$fn(x1+\Delta x1, \ldots, x8+\Delta x8) = fn\ (x1, \ldots, x8) + dfn/dxn \cdot \Delta xn = 0$$

Therefore, $$dfn/dxn \cdot \Delta xn = -fn(x1, \ldots, x8)$$
$$= -(\xi n - \xi n')$$
$$= -(Fn\ (x1, \ldots, x8) - \xi n')$$
$$= \xi n' - Fn\ (x1, \ldots, x8)$$

In addition, dfn/dxn=dFn/dxn and $$dFn/dxn \cdot \Delta xn = \xi n' - Fn\ (x1, \ldots, x8) \quad (1)$$

Here, the equation (1) is represented as a matrix, the ideal standard mounting parameters as shown in FIGS. 5A and 5B are substituted in x1 through x8 as initial values, and dFn/dxn and Fn are calculated. Since $\xi n'$ has been found as described above, $\Delta x1$ through $\Delta x8$ can be calculated. Then, the values of x1 through x8 are corrected by adding $\Delta x1$ through $\Delta x8$ to x1 through x8 respectively and are substituted in the equation (1) to find $\Delta x1$ through $\Delta x8$. By repeating this processing until $\Delta x1$ through $\Delta x8$ become 0 or a predetermined value in the vicinity of 0, the real mounting parameters x1 through x8 can be found.

In this way, the real mounting parameters are calculated, and the logic drawing circuit 61 calculates new virtual target points R1 through R4 based on the real mounting parameters to display the new virtual target points R1 through R4 on the monitor screen 65 again. In addition, since data of the virtual image, for example, display data of the steering supporting guide, in the same coordinate system as the virtual target 85, are prepared again, the positional relation between the real image and the virtual image can be properly corrected.

With this processing, even if the optical axis 77 of the lens 23 does not coincide with the center of the CCD area sensor 25 and the CCD camera cannot be mounted on the vehicle properly as prescribed by the standard, the positional relation between the real image and the virtual image can be properly corrected without physically adjusting the optical axis 77 of the lens 23 and without performing adjustment work for mounting the CCD camera on the vehicle with high accuracy as prescribed by the standard. That is, the positional relation between a vehicle rear image as the real image and a steering supporting guide as the virtual image can be made proper.

Fifth Embodiment

Figure 8:
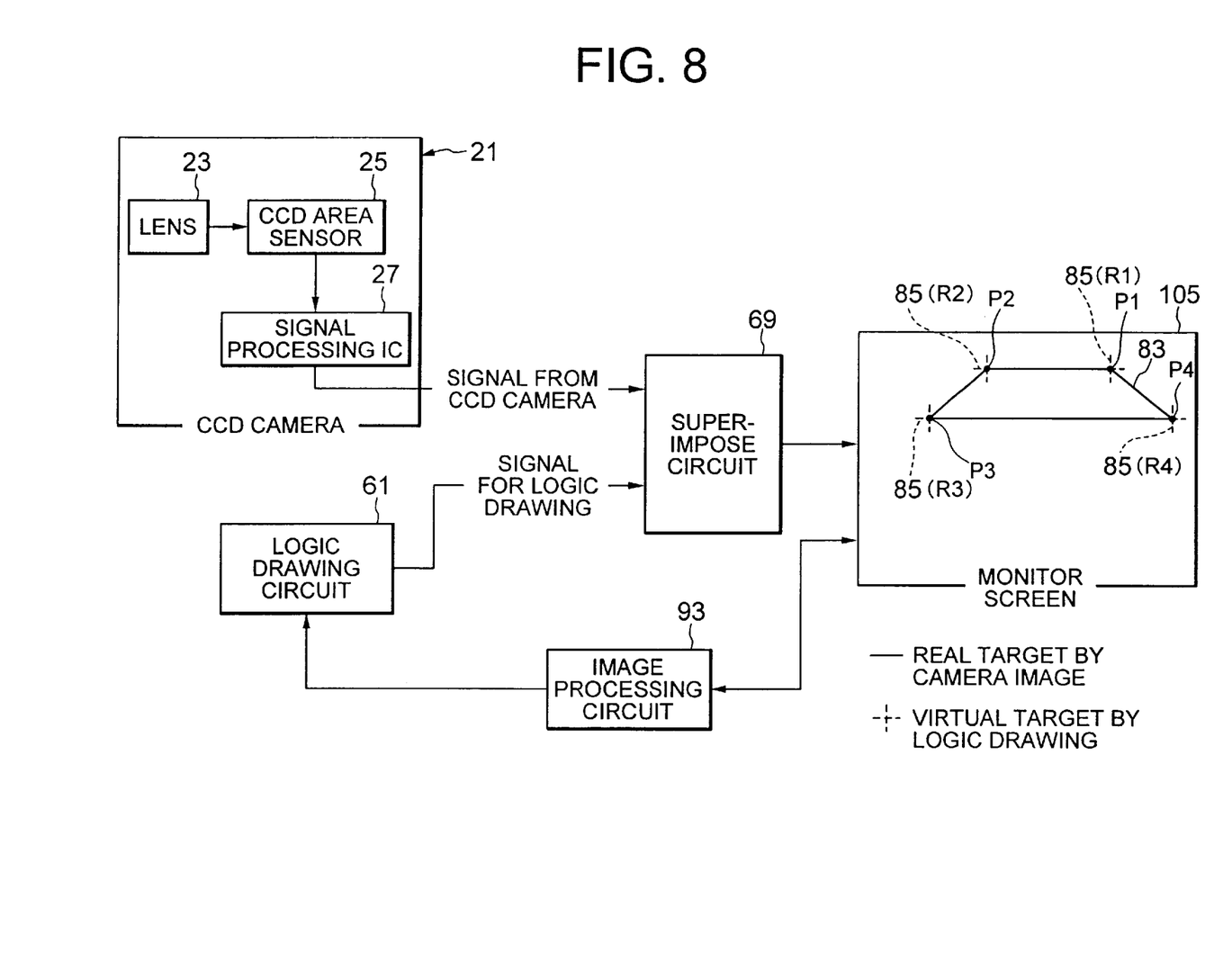
FIG. 8 is a block diagram illustrating an outline of an image positional relation correction apparatus in accordance with a fifth embodiment of the present invention.

FIG. 8 is a block diagram illustrating the outline of an image positional relation correction apparatus in accordance with the fifth embodiment of the present invention. An image positional relation correction apparatus in accordance with the fifth embodiment is different from the image positional relation correction apparatus in accordance with the above-mentioned fourth embodiment mainly in that the former is provided with an image processing circuit 93 instead of the controller 63 as correcting means and a monitor screen 105 has no touch panel.

The image processing circuit 93 performs image processing of the real target 83 displayed on the monitor screen 105, calculates the coordinates of the image standard points P1 through P4, and output the coordinates to the logic drawing circuit 61. The logic drawing circuit 61 calculates real mounting parameters by the above-mentioned Newton-Raphson method and calculates the coordinates of the virtual target point R1 through R4 of the virtual target 85 based on the real mounting parameters, and then the virtual target points R1 through 4 are displayed on the monitor screen 105 via the superimpose circuit 69.

In this way, since the image processing circuit 93 calculates the coordinates of the image standard points P1 through P4 by the image processing and the virtual target points R1 through R4 based on the real mounting parameters are displayed from the beginning, adjustment work by a user for coinciding the virtual target points R1 through R4 with the image standard points P1 through P4 by operating the touch panel is unnecessary, which reduces manufacturing costs.

Sixth Embodiment

Figure 9:
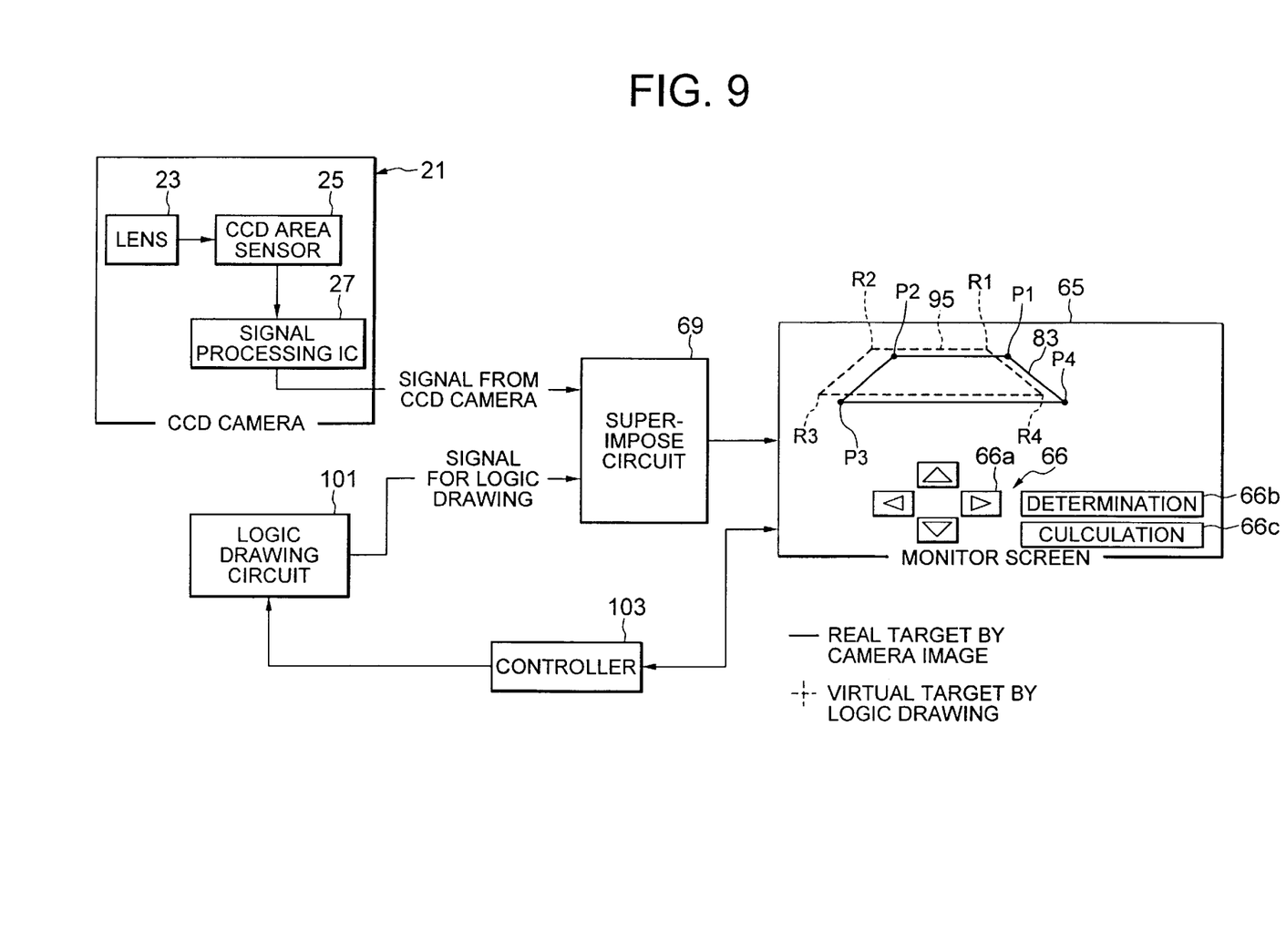
FIG. 9 is a block diagram illustrating an outline of an image positional relation correction apparatus in accordance with a sixth embodiment of the present invention.

FIG. 9 is a block diagram illustrating the outline of an image positional relation correction apparatus in accordance with the sixth embodiment of the present invention. An image positional relation correction apparatus of the sixth embodiment is different from the image positional relation correction apparatus in accordance with the above-mentioned fourth embodiment mainly in the logic drawing circuit 101 and the controller 103.

A rectangular virtual target 95 is displayed on the monitor 65 based on the rectangular coordinate data with the virtual target points R1 through R4 calculated by the logic drawing circuit 101 as vertexes. In addition, the cross button 66a is operated on the controller 103 after selecting an object of shifting, for example, the virtual target point R1, among the virtual target points R1 through R4 to be objects of shifting by a selection button (not shown) provided on the monitor, the selected virtual target point R1 shifts. Every time the virtual target point R1 shifts, the shifting amount is inputted in the controller 103. The controller 103 calculates the coordinates of the image standard point Q1 assuming that the position of the virtual target point R1 is the point of the image standard point Q1 based on the shifting amount of the virtual target point R1, and, at the same time, outputs the coordinates to the logic drawing circuit 101. The logic drawing circuit 101 calculates real mounting parameters by the Newton-Raphson method based on the image standard point Q1, and displays a rectangular virtual target 95 with new virtual target points R1 through R4 as vertexes on the monitor screen 65 again based on the real mounting parameters. By repeating this operation while changing a virtual target point to be an object of shifting by the selection button, the form of the virtual target 95 displayed on the monitor screen 65 is changed.

In this way, when the rectangular virtual target 95 is displayed on the monitor screen 65, the user can sensuously determine whether proper real mounting parameters are calculated by comparing the shapes of the virtual target 95 and the real target 83 and judging how not only the vertexes but also the sides of both the targets coincide with each other.

In addition, since the monitor screen 65 makes a display by the unit of one dot, the coordinates of the real target 83 that can be obtained by making the virtual target 95 to coincide with the real target 83 are dispersing by the unit of a dot, and the coordinates falling in the middle of the dots cannot be obtained. On the other hand, the distinction of a real image of the monitor screen 65 is limited and, particularly when the virtual target 95 is coincided with the real target 83 in a remote place, the accuracy has limitation.

Therefore, when the rectangular virtual target 95 is displayed on the monitor screen 65, it becomes easy for the user to determine the difference between the calculated real mounting parameters and the real camera mounting state by judging the inclination of the sides of the rectangular of the virtual target 95, the degree of paralleling and the symmetricalness of opposing sides, or the degree of skew of the sides of the real target 83 against the sides of the virtual target 95.

Other Embodiments

The present invention is not limited to the above-mentioned embodiments, but can be embodied by applying modifications as hereinafter described. First, if a test chart member for real target providing means takes the form in which it is placed in a predetermined coordinate position with respect to a vehicle, it may not be necessarily mounted on the vehicle or disposed on a road surface but may be white lines drawn on the road surface. In addition, the number and the shape of real targets provided on the test chart member are not limited to those shown in the above-mentioned embodiments. Moreover, real target providing means is not necessarily a member separate from the vehicle like the test chart member, but a part of the vehicle in the object area of a camera may be assumed to be the real target.

In addition, although the controller 33 and the cross button 37 are used for operation in the above-mentioned first embodiment, and the touch panel is used in the fourth and the sixth embodiments, operating means is not limited to these but may be any means operable to overlap a virtual target point and an image standard point. Operation procedures are not limited to the foregoing as well, but various procedures may be implemented within the scope not deviating from the purport of this invention.

Further, although a virtual image by logic drawing is corrected in the above-mentioned first embodiment and a real image photographed by a CCD camera is corrected in the second embodiment, the method of correction is not limited to these but such forms may be possible as to correct the real image photographed by the CCD camera in the first embodiment and to correct the virtual image by logic drawing in the second embodiment.

Moreover, the above-mentioned embodiments are described concerning the case in which the embodiments are applied to the correction of images in a steering supporting apparatus of a vehicle, an image positional relation correction apparatus of the present invention is not limited to this but may be applied to image correction in other apparatuses for superimposing to display a real image and a virtual image.

Furthermore, if a CCD camera is mounted on a vehicle as prescribed by the standard, the Newton-Raphson method may be applied only to the deviation amount of the center of a CCD sensor area against the optical axis of a lens. On the other hand, if the deviation amount of the center of the CCD sensor area against the optical axis of the lens is known or there is no deviation amount, the Newton-Raphson method may be applied to six parameters of the positions and the angles for mounting the CCD camera to the vehicle.

If a deviation between a real image and a virtual image arises due to such factors as the focal length and skewness of a lens, and dispersion of the inclination of the light receiving surface of a CCD area sensor against the optical axis of the lens, the focal length and skewness of the real lens, and the inclination of the light receiving surface of the CCD sensor against the optical axis of the lens may be calculated by adding the factors in parameters and applying the Newton-Raphson method.

In addition, although the rectangular virtual target 95 with the virtual target points R1 through R4 is used in the sixth embodiment, virtual targets are not limited to these but additional virtual target points R5, R6, . . . may be used. In this case, the virtual target points R1 through R4 may be shifted so that the additional virtual target points R5, R6, . . . overlap additional standard points Q5, Q6, . . . as in the sixth embodiment, or the difference amount between the additional virtual target points R5, R6, . . . and the additional image standard points Q5, Q6, . . . may be grasped by moving the R5, R6, . . . directly. The amount by which the virtual target points R1 through R4 should be shifted can be calculated based on the grasped difference amount. In this way, since the repetition of an operator's adjustment operation, namely, [shift]→[match determination]→[shift]→[match determination], becomes unnecessary, and operation time can be reduced and, at the same time, correction with high accuracy becomes possible.

Moreover, the image processing circuit used in the fifth embodiment may be added to the image positional relation correction apparatus of the sixth embodiment to coincide a virtual target with a real target more accurately by operating the controller to the rectangular virtual target displayed as a result of the image processing.

Further, since the screen of the monitor displays by the unit of one dot, coordinates with the accuracy of less than one dot unit cannot be calculated if the virtual target has four points. However, if not only four points but also a rectangular shape is displayed as the virtual target, as the image positional relation correction apparatus of the sixth embodiment, the logic drawing circuit may define coordinate data of each point on the rectangular using the coordinates corresponding to 0.1 dot of the monitor screen. If a rectangular shape based on the coordinate data with accuracy higher than the dot of the monitor screen, the coordinates of the real target on the monitor screen can be obtained with higher accuracy due to the degree of linear deviation of the sides of the rectangular.

Moreover, a virtual target may be one that not only displays a position corresponding to a real target but also displays a position where an optical axis of a lens of a camera reaches a road surface.

What is claimed is:

1. An image positional relation correction apparatus for correcting relative positional relation between a real image taken by a camera and a virtual image to be superimposed to be displayed on a monitor screen together with the real image comprising:

real target providing means provided in an object area of the camera for causing the camera to photograph a plurality of real targets;

virtual target providing means for providing a plurality of virtual targets logically led respectively from coordinates of the plurality of the real targets to the same coordinate system as the virtual image; and correcting means for correcting the relative positional relation between the real image and the virtual image based on deviation between the real targets and the virtual targets respectively corresponding to the real targets, wherein said correcting means calculates the coordinates of the real target photographed by the camera in the same coordinate system as the virtual image, stores in advance standard parameters including a standard position and angle of a camera mounted on a vehicle, calculates the coordinates of the virtual target logically led from the real target by the standard parameters, calculates real mounting parameters including the real position and angle of the camera based on the deviation between the coordinates of the virtual target and the coordinates of the real target and the standard parameters, and corrects the relative positional relation between the real image and the virtual image based on the real mounting parameters.

2. An image positional relation correction apparatus according to claim 1, wherein said correcting means calculates the real mounting parameters of the camera by the Newton-Raphson method based on the deviation between the coordinates of the virtual target and the coordinates of the real target and the standard parameters.

3. An image positional relation correction apparatus according to claim 1, wherein said correcting means is provided with a controller for shifting one of the real target and the virtual target on the monitor screen and superimposing one on the other.

4. An image positional relation correction apparatus according to claim 1, wherein said correcting means is provided with a touch panel for shifting one of the real target and the virtual target on the monitor screen and superimposing one on the other.

5. An image positional relation correction apparatus according to claim 1, wherein said correcting means is provided with an image processing circuit for detecting the deviation between the real target and the virtual target by image processing.

6. An image positional relation correction apparatus according to claim 1, wherein said virtual target providing means provides a rectangular figure as the virtual target displayed on the monitor screen.

7. An image positional relation correction apparatus according to claim 6, wherein said correcting means corrects the coordinates for each vertex of said rectangular figure.

8. A steering supporting apparatus provided with an image positional relation correcting apparatus according to claim 1, wherein the real image and the virtual image are a rear image of the vehicle and a steering supporting guide, respectively.

9. A steering supporting apparatus according to claim 8 wherein said real target providing means is a member which is mounted on the rear part of the vehicle and has a real target on a surface.

10. A steering supporting apparatus according to claim 8, wherein said real target providing means is a member which is disposed on a road surface backward of the vehicle and has a real target on the surface.

11. An image positional relation correction apparatus according to claim 8 wherein the real target is a rectangular figure.

12. An image positional relation correcting method for correcting relative positional relation between a real image taken by the camera and a virtual image to be superimposed to be displayed on a monitor screen together with the real image comprising the steps of:

causing said camera to photograph a plurality of real targets;

setting the plurality of virtual targets logically led respectively from the coordinates of the plurality of the real targets on the same coordinate system as said virtual image; and correcting the relative positional relation between said real image and said virtual image based on the deviation between the real targets and the virtual targets respectively corresponding to the real targets, wherein said step of correcting the relative positional relation calculates the coordinates of the real target photographed by the camera in the same coordinate system as the virtual image, stores in advance standard parameters including a standard position and angle of a camera mounted on a vehicle, calculates the coordinates of the virtual target logically led from the real target by the standard parameters, calculates real mounting parameters including the real position and angle of the camera based on the deviation between the coordinates of the virtual target and the coordinates of the real target and the standard parameters, and corrects the relative positional relation between the real image and the virtual image based on the real mounting parameters.

13. An image positional relation correction apparatus according to claim 2, wherein the standard parameters and the real mounting parameters include parameters in the camera itself which include at least one of a focal length and distortion of the camera lens, and amount of deviation and inclination of the CCD sensor in relation to the optical axis of the lens.

14. An image positional relation correction apparatus according to claim 3, wherein the controller independently shifts one of the plurality of real targets and the plurality of virtual targets respectively corresponding to the real targets on the monitor screen and superimposes one on the other.

* * * * *

UNITED STATES PATENT AND TRADEMARK OFFICE
CERTIFICATE OF CORRECTION

PATENT NO. : 6,785,404 B1
DATED : August 31, 2004
INVENTOR(S) : Shimazaki et al.

It is certified that error appears in the above-identified patent and that said Letters Patent is hereby corrected as shown below:

<u>Column 6,</u>
Line 39, please delete "$\Delta cy$" and insert therefore -- $\Delta Cy$ --;

<u>Column 9,</u>
Line 11, please delete "equation$\xi n$" and insert therefore -- equation $\xi n$ --.

Signed and Sealed this

Eighteenth Day of January, 2005

JON W. DUDAS
*Director of the United States Patent and Trademark Office*